(No Model.)
J. W. MARTIN.
APPARATUS FOR BOILING SOAP.
No. 475,784. Patented May 31, 1892.
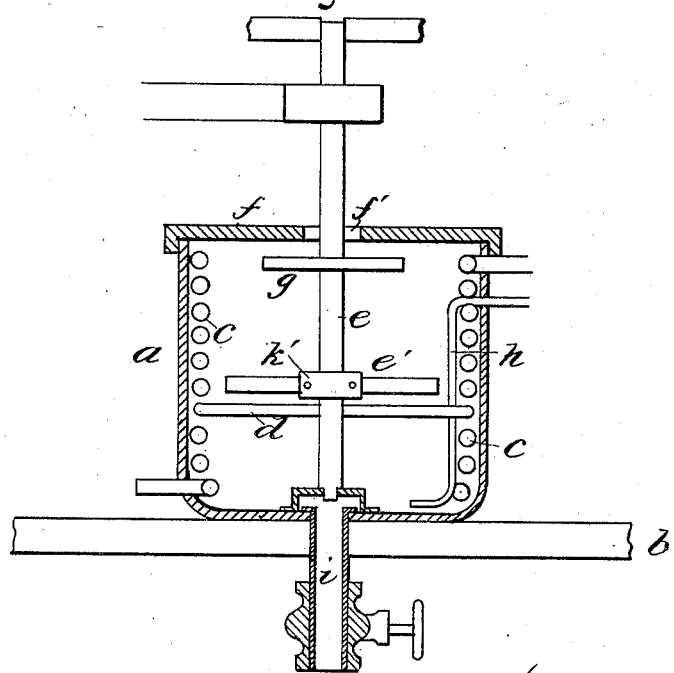
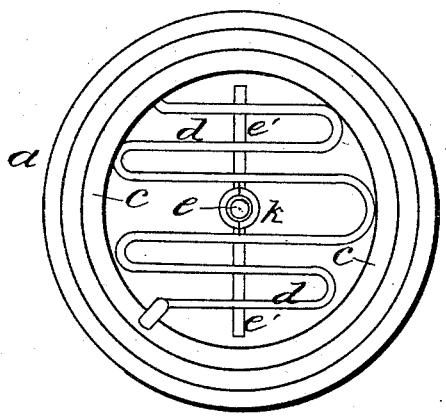
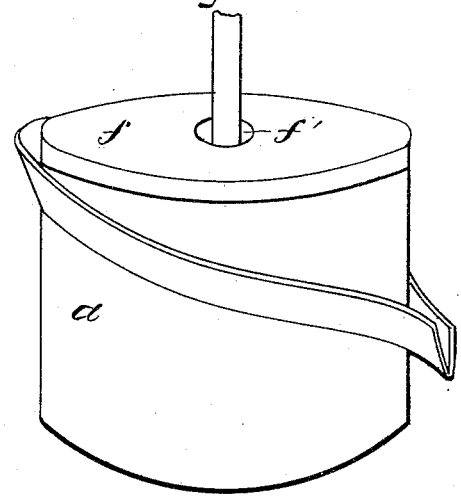
Witnesses
H. T. Giddings
G. B. Jenkins
Inventor
Joel W. Martin
By Chas. L. Burdett,
Attorney

UNITED STATES PATENT OFFICE.

JOEL W. MARTIN, OF HARTFORD, CONNECTICUT.

APPARATUS FOR BOILING SOAP.

SPECIFICATION forming part of Letters Patent No. 475,784, dated May 31, 1892.

Application filed September 16, 1891. Serial No. 405,882. (No model.)

*To all whom it may concern:*

Be it known that I, JOEL W. MARTIN, of Hartford, in the county of Hartford and State of Connecticut, have invented certain new and useful Improvements in Apparatus for Boiling Soap, of which the following is a full, clear, and exact description, whereby any one skilled in the art can make and use the same.

The object of my invention is to provide a device by the use of which a superior quality of soap may be cheaply made by providing means for the thorough mixing of the ingredients while they are being boiled.

To this end my invention consists in the details of the several parts making up the device as a whole and in their combination, as more particularly hereinafter described, and pointed out in the claim.

Referring to the drawings, Figure 1 is a detail view in vertical section through the center of a kettle embodying my invention, the receiving-trough being omitted. Fig. 2 is a detail view in cross-section through the kettle just under the lower bend and looking upward, the receiving-trough being omitted. Fig. 3 is a side view of the apparatus, showing the receiving-trough.

In the accompanying drawings, the letter $a$ denotes a kettle adapted for boiling soap, that is supported in any convenient manner in the floor $b$ or other suitable support. Within the kettle is arranged a number of steam-pipes, either in coils $c$ or in layers $d$, that may be in the form of coils or simply bends. These coils or bends $d$ are preferably arranged horizontally across the kettle with spaces between them, left so as not to impede the movements of beater-arms $e'$, that are secured to a rotary spindle $e$, that projects within the kettle. It is intended that these beater-arms shall be arranged on opposite sides of a given horizontal coil of pipe $d$—that is, that the beater-arms and layers or coils of pipes shall be arranged alternately, so as to provide for a thorough heating and mixing of the contents of the vessel by means of the beater-arms and the heated steam in the pipes. The spindle $e$ projects within the kettle, passing through an opening $f'$ in the cover $f$ and having a disk $g$ secured to the spindle below the opening and forming a baffle-plate, which prevents the contents of the kettle in ebullition from being thrown out through the hole in the cover, that is left larger than the diameter of the spindle in order to allow the free steam to escape. This free steam is admitted to the kettle through a suitable pipe $h$, that opens near the bottom of the kettle and within it, and the vessel is provided with a suitable passage-outlet $i$, that may be provided with a valve for the purpose of removing the contents of the kettle. It is not necessary that the coil should be arranged horizontally with the beater-arms arranged alternately, as they may be set in other positions with spaces arranged for beater-arms to be rapidly moved between them. These beater-arms are so set as to thoroughly mix the contents of the kettle, and in using it a given weight of stock, of about the total amount that the kettle will hold, is first put into it and a small portion of the chemicals then added, the beaters being rapidly driven through the kettle, while a high degree of heat is maintained by the circulation of steam through the pipes. Proper supplies of chemicals are added from time to time as the operation of boiling and mixing is proceeding.

The alternate arrangement of beater-arms and layers of steam-pipes that extend throughout the kettle is extremely efficacious in thoroughly mixing the fat and the lye while they are boiling. It promotes a thorough saponification of the whole mass, and it promotes a saving in the time of manufacture and improves the quality of the soap produced. The beater-arms may be secured to the spindle by forming a socket $k$, as by bending the arm at the base and allowing two arms to lap by each other and securing them to each other by means of bolts $k'$, as shown in Fig. 2 of the drawings. The beater-arms may also be secured to the spindle by providing a clamp device consisting of two parts secured together by bolts, as shown in Fig. 1 of the drawings, and when thus secured together embracing and clasping the spindle, thus holding the arm securely in any desired position. In each end of such a clamp device would be provided a lengthwise socket for the reception of the inner end of the beater-arms and a clamp-screw extending from the outside of the clamp device into this socket be used to hold the beater-arms at any desired angle with respect to their path of movement.

In order to prevent waste from the boiling over of the ingredients during the process of making the soap I provide the outside of the kettle with a trough, preferably cast integrally with it, although it may be made separate and secured to the outer surface, this gutter or trough being inclined from the highest point on one side to a point where a leader may be attached to conduct the overflow to any suitable receptacle, from which it may be returned to the kettle as soon as the contents have settled back from this boiling over.

I claim as my invention—

In combination with a kettle for boiling soap, coils of steam-pipes horizontally arranged within the kettle, a rotary beater-spindle extending upward through the cover, beater-arms adjustably secured to said spindle, mechanism for rotating the spindle, a cover having an opening therethrough larger than the diameter of the beater-spindle, and a disk located on the spindle underlying the opening in the cover and larger in diameter than said opening, all substantially as described.

JOEL W. MARTIN.

Witnesses:
CHAS. L. BURDETT,
A. B. JENKINS.